(12) United States Patent
Ranganathan et al.

(10) Patent No.: US 8,107,458 B1
(45) Date of Patent: *Jan. 31, 2012

(54) POWER-BASED NETWORKING PATH ALLOCATION

(75) Inventors: Parthasarathy Ranganathan, Fremont, CA (US); Puneet Sharma, Long Beach, CA (US); Sujata Banerjee, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 515 days.

This patent is subject to a terminal disclaimer.

(21) Appl. No.: 11/496,859

(22) Filed: Aug. 1, 2006

(51) Int. Cl.
*H04L 12/28* (2006.01)
(52) U.S. Cl. ......... 370/351; 370/350; 370/389; 370/254
(58) Field of Classification Search .................. 370/350, 370/351, 389, 254
See application file for complete search history.

(56) References Cited

U.S. PATENT DOCUMENTS

| | | | |
|---|---|---|---|
| 7,003,563 B2 * | 2/2006 | Leigh et al. ................... | 709/223 |
| 2003/0065497 A1 | 4/2003 | Rhoads | |
| 2003/0154236 A1 | 8/2003 | Dar et al. | |
| 2003/0229720 A1 | 12/2003 | Kiremidjian et al. | |
| 2006/0146696 A1 * | 7/2006 | Li et al. ......................... | 370/218 |
| 2006/0159021 A1 * | 7/2006 | Asghar et al. ................. | 370/237 |
| 2006/0268908 A1 * | 11/2006 | Wang et al. ................... | 370/401 |
| 2006/0285579 A1 * | 12/2006 | Rhee et al. .................... | 375/132 |

OTHER PUBLICATIONS

Gupta, M. et al., "Feasibility Study for Power Management in LAN Switches", Proc. of the 12th IEEE Conf. on Network Protocols (ICNP'04) 2004.
Gupta, M. et al., "Greening of the Internet", SIGCOMM'03, ACM Aug. 2003.
Kumar, R. et al., "Processor Power Reduction Via Single-ISA Heterogeneous Multi-Core Architectures", Apr. 2003.
Want, B. et al., "Computational Energy Cost of TCP", ACM SIGMETRICS'03 Conf., 2004.

* cited by examiner

*Primary Examiner* — Dang Ton
*Assistant Examiner* — Pamit Kaur

(57) ABSTRACT

A method for routing network traffic in a data network having a plurality of network switches, the method including identifying network traffic to be routed in the data network, evaluating multiple options for allocating at least one data path in the data network to handle the identified network traffic, selecting one option from the multiple options for data-path allocation based on at least one predetermined policy, and controlling the plurality of network switches based on the selected option.

20 Claims, 3 Drawing Sheets

FIG. 1 –PRIOR ART

POWER-BASED NETWORKING PATH ALLOCATION

RELATED APPLICATIONS

This application incorporates by reference in its entirety the following commonly assigned U.S. Utility Patent Applications: Ser. No. 11/496,945, entitled "HETEROGENEOUS NETWORK SWITCH SYSTEM," and Ser. No. 11/496,860, entitled "POWER-BASED NETWORKING RESOURCE ALLOCATION," which are being filed on the same date herewith.

BACKGROUND

Data centers typically have racks of computer equipment and media storage equipment interconnected hierarchically via network switches, routers, or both. In a utility computing environment, such as a data center, computers and media storage can be allocated on demand to applications according to the current application load. When an instance of an application/service starts up, it is allocated resources such that the network bandwidth between the network switches or routers is sufficient to support the projected demand for such an application. The purpose is to load balance the network load such that no single switch or router is overwhelmed by the network load. Currently, most network equipments in a typical data center are powered on all the time, even at times when the load in the data center is close to zero.

BRIEF DESCRIPTION OF THE DRAWINGS

Embodiments are illustrated by way of example and not limited in the following figure(s), in which like numerals indicate like elements, in which.

DETAILED DESCRIPTION

Figure 1:
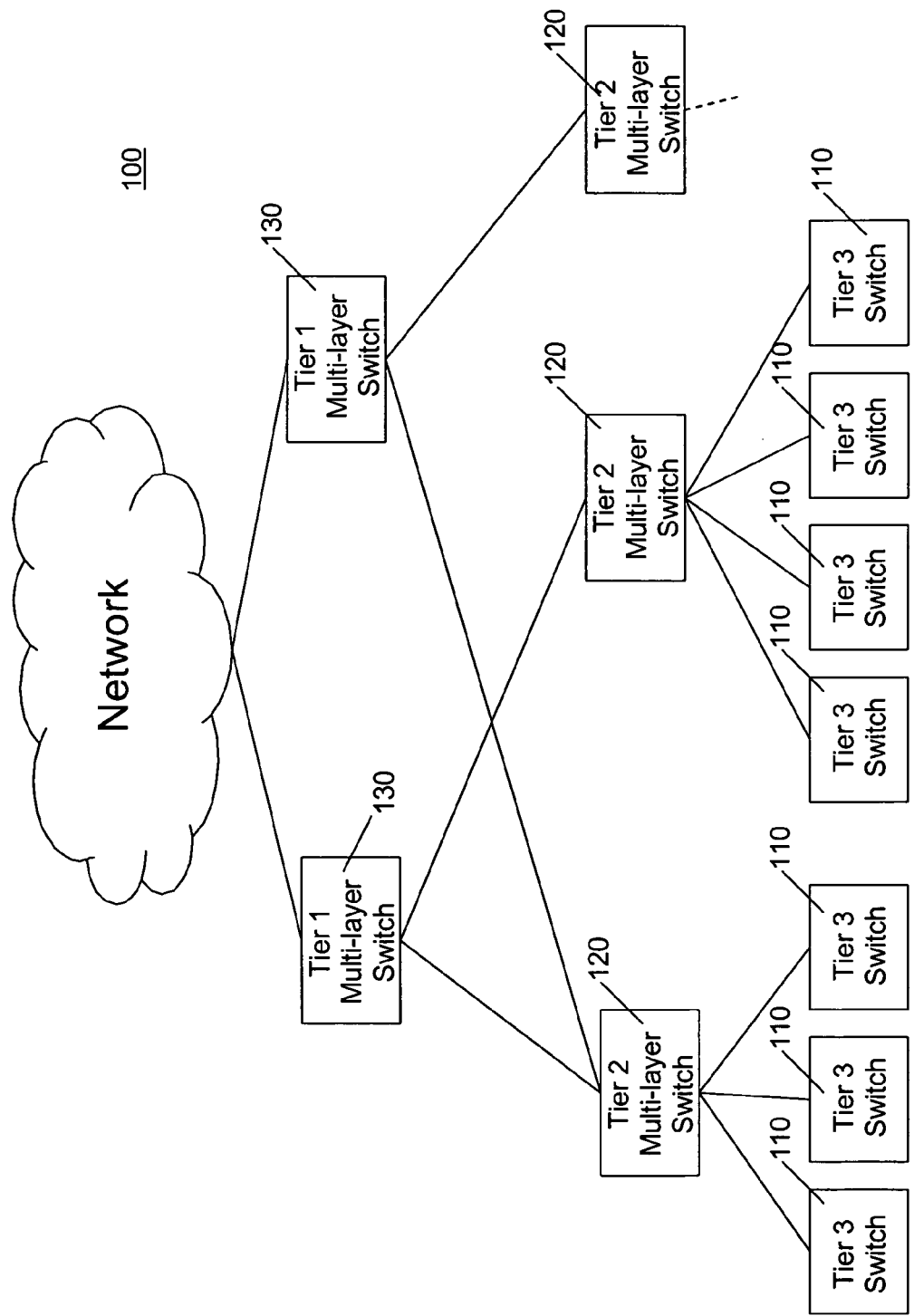
FIG. 1 illustrates a typical networking hierarchy of an information technology (IT) infrastructure.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

As referred herein, a data center is a location or facility that houses resources for handling the data necessary for desired operations, such as information technology (or IT) operations. In the case of the data center, its resources are mainly electronic equipment, such as computer systems, network equipment, communications equipment and other peripheral equipment that handle IT operations. Each electronic equipment unit may comprise, for example, processors, microcontrollers, high-speed video cards, memories, semi-conductor devices, and the like to perform the desired functions. The electronic equipment may be arranged in a number of racks, each configured to house one or more units of electronic equipment.

Power consumption and heat generation are increasingly becoming important bottlenecks in data centers. They affect both the capital costs, for power delivery and heat extraction equipment, and the recurring costs, for electricity consumption, incurred by the data centers. Additionally, power consumption and heat generation have secondary impact on the density, reliability, and manageability of a data center. A major culprit of power consumption and heat generation in a data center is the network equipment used to set up one or more data networks managed and maintained by the data center. For example, even if a single computer or media storage unit in a rack is allocated to an application, the network switches on that rack must be powered on to enable connectivity to that single unit. Thus, as mentioned earlier, there are instances whereby most network equipments in a data center are powered on at all time, including when the load in the data center is close to zero. This is inefficient from the standpoint of conserving the power used by the network equipments. It has been found from measurements of power consumption at data centers that networking power in a data center, i.e., power consumed by the network equipment therein, is the third largest component of total power consumed by the data center, and it could take as much as 15% of the total power budget of the data center.

Prior work on data center power and heat management has primarily focused either on the lower server level or the higher Internet level, but not on the networking power in the context of data center environments. This is because prior work has traditionally concentrated on issues related to cooling data center facilities and adaptively switching off (or enabling sleep mode) of network equipment while ignoring networking power consumption. There is a growing need for better power and heat management in the IT field because of the desire to lower capital and recurring costs; the desire for better compaction, reliability, and manageability of network equipments; and the desire to meet environmental standards.

Accordingly, method and systems for minimizing the power consumed by the network equipment in a data center are described herein. Embodiments of the present invention seek to consolidate the usage of computers and media storage equipment in a data center such that the rack utilization is maximized and power consumption is lowered. Consequently, for example, some equipment racks in the data center are not allocated to any applications, and the network equipment connected to that rack can be switched off entirely. Additional embodiments of the present invention seek to apply the aforementioned consolidation techniques to higher layers of the network topology by switching off intermediate-level switches when all the racks or network equipments connected to such switches are not allocated to any applications. Consequently, the network equipments at different hierarchical levels, from rack level to internet level, in an IT infrastructure can be statically or dynamically turned off. Proactively allocating resources to network equipments in accordance with embodiments of the present invention lead to maximum utilization of the network equipments (such as racks in a data center), increased power density, and significant savings in energy costs associated with the operation of such network equipments, including network switches and routers, when demand is low.

FIG. 1 illustrates a typical data network hierarchy 100 (hereinafter, "network hierarchy") of a data center. As depicted, the network hierarchy 100 is organized as multiple tiers, with multiple switches associated with each tier. This multiplicity is incorporated into data network designs to provide redundancy for higher availability and higher parallelism for extra performance. Tiers 1 and 2 typically include larger switches 130 and 120, and tier 3 typically includes smaller switches 110. The larger switches 130 and 120 in tiers 1 and 2 are typically multi-layer switches that provide switching to the smaller switches in tier 3. Alternatively, routers may be used in place of one or more of the switches 110 and 120 to provide routing or switching to the network switches 130, as also understood in the art. The smaller switches 110 in tier 3 are network switches operating at Open Systems Interconnection (OSI) Layer 2, as understood in the art. Examples of tier-3 switches include but are not limited to Storage Area Network (SAN) gateways, SAN switches, Ethernet switches, rack switches, firewalls. For example, in a data center housing multiple equipment racks as discussed earlier, each rack may include one or more switches 110 to provide switching to equipment, (servers and other computer equipment, communication equipment, etc.) in the rack at Tier 1. In turn, switches 130 and 120 provide switching to the multiple racks. In another example, in a data center that houses network equipments for multiple local area networks (LANs), SANs, or both, each LAN or SAN may include one or more switches 110 to provide switching to the network equipments or devices therein. In turn, switches 130 and 120 provide switching to the multiple LANs, SANs, or both that are maintained by the data center. As illustrated in FIG. 1, the networking hierarchy 100 includes three tiers or levels of switches, each level having four switches or less. However, it should be understood that, in general, the network hierarchy 100 is vertically scaleable for two or more tiers of switches and horizontally scaleable across two or switches.

Power inefficiencies in the network hierarchy 100 are typically found at both the inter-switch level and intra-switch level. At the inter-switch level, i.e., between the switches, during periods of network inactivity or low activity, only a fraction of the switches 110, 120 and 130 may be used to route and process the network traffic or load. Nevertheless, all of such switches remain active and needlessly consume power. Likewise, at the intra-switch level, i.e., at individual switches, during periods of network inactivity or low activity, the power level at each switch remains constant irrespective of its usage to handle the network load. Additional power inefficiencies arise from peak risk tolerance, i.e., built-in redundancy of equipment in the network hierarchy 100 for periods of peak network usage or equipment failure to achieve a desired risk tolerance. Again, power usage of all switches in the built-in redundancy setup remain active and constant regardless of their usage, or non-usage during periods of network inactivity, low activity, or performance without failure.

Figure 2:
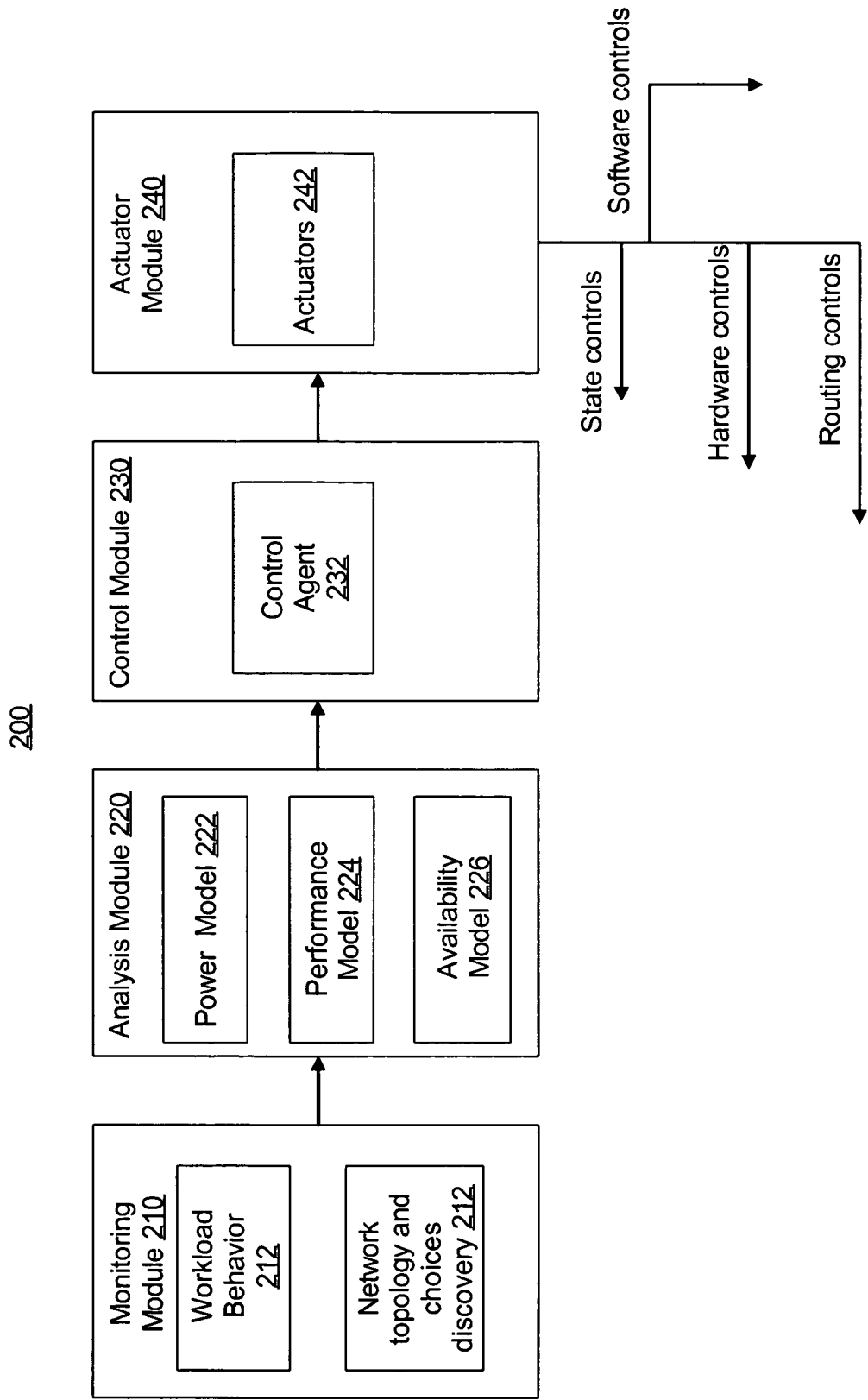
FIG. 2 illustrates a block diagram of a system 200 for data-path allocation to optimize power consumption in a computing environment, in accordance with one embodiment of the present invention.

FIG. 2 illustrates a block diagram of a system 200 for data path allocation to optimize power consumption in a computing environment, such as the data center as represented by the network hierarchy 100 in FIG. 1. The system 200 includes a monitoring module 210, an analysis module 220, a control module 230, and an actuator module 240.

The monitoring module 210 includes a workload behavior module 212 and a network topology and choices discovery module ("network discovery module") 214. The workload behavior module 212 is responsible for identifying the network traffic in the network hierarchy 100 that is required by network applications to be run or processed by the data center. In other words, the workload behavior module 212 is responsible for identifying the behavior of a predetermined set of anticipated workloads in the network hierarchy 100. Thus, as referred herein, a workload is a quantity or an amount of data processing being done or performed, whereby data processing involves commands, input/output operations, routine or function calls, or the like, or any combination thereof being done. In one embodiment, the network applications desired to be run in the network hierarchy 100 are specified by the user. According to one embodiment, the work behavior module 212 receives as input workload requests, each in the form of the workload to be performed and a prediction of resource utilization in performing the requested workload.

Input of the workload to be performed include, for example, information pertaining to computing requirements (e.g., CPU power), performance requirements (e.g., speed and latency), and memory requirements (e.g., required storage capacity) of the workload. Such information may be generated, automatically by the monitoring module 210 or manually entered by the user, based upon knowledge of the network applications to be run in the network hierarchy 100.

Input of the prediction of resource utilization include information pertaining to a prediction of one or more of CPU utilization, memory utilization, power utilization (consumption) and storage utilization needed to accommodate the requested workload. In addition, input of the prediction of resource utilization to be performed may include network utilization, including possible data paths for the network traffic to traverse throughout the network hierarchy 100, and activities at the individual switch level in terms of the network traffic passing through the network switches as well as the usage of sub-resources in each switch (for example, number of ports, etc.) The information pertaining to the predicted resource utilization may be generated based upon knowledge of the types of workload to be performed and past resource utilization. In this regard, any available algorithm that determines the types of workload to be performed based on the network applications and the past resource utilizations corresponding to those types of workload to be performed may be employed to generate the predicted resource utilization. Alternative embodiments are contemplated wherein the information pertaining to the predicted resource utilization may be obtained from one or more Service Level Agreements (SLAs) for running the desired network applications.

The network discovery module 214 is responsible for monitoring and identifying the network topology of the network hierarchy 100. Information pertaining to network topology includes the number of links and nodes representing routers or switches in the network hierarchy 100 and their network connections to one another, and network activities at the overall network level for past network traffic in terms of multiple different network resources used in the past for the same workload, data paths for routing the workload to and from the different network resources, and usage frequencies for these different network resources, including the network switches. To that end, the network discovery module 214 may access any existing network management software or scheme used by the data center to manage its network in order to monitor and obtain the network topology information. The network discovery module 214 also keeps an updated database of the various options available for power control of the individual switches—for example, the power consumption of various switches, the various power states possible per switch, etc. Examples of various power states possible for a switch include but are not limited to: 1) power states indicating power on/off of the entire switch; 2) power states resulting from deactivation of different subcomponents of a switch, such as power on/off of specific data ports or specific memory banks on the switch; and 3) power states resulting from setting different clock frequencies or rates of the switch, which generate different power consumption levels for the switch. The various available power states for the network switches may be defined by the open industry standard, the Advanced Configuration and Power Interface (ACPI).

The analysis module 220 employs various models 222, 224, and 226 to evaluate the power, performance, and availability implications of various data paths choices for routing network traffic. In one embodiment, each data-path allocation choice includes the number and type (for example, Tier-1, Tier-2, or Tier-3 type) of switches being used, and the power state for each switch. The analysis module 220 receives information provided by the workload behavior module 212 and the network discovery module 214 and passes on such information to the models 222, 224, and 226, which then generate the various data-path choices through simulations of the models. For example, for a given set of choices on the power states of various network switches and a given expectation on the nature of the network traffic to be generated from the predetermined set of anticipated workloads, the models 222, 224, and 226 are operable to provide, for each data-path choice, estimates of predicted power consumption, potential SLA degradations, potential loss in availability of the resources used, risk tolerance, fault tolerance, and any other desirable factors relating to power, performance, or availability of resources in the data center. In this regard, any available modeling techniques for simulating the models 222, 224, and 226 may be employed. Although FIG. 2 illustrates the models as separate entities, it should be understood that they may be combined into a single model to provide the aforementioned estimates. Examples of available simulations for the models are found in U.S. Pat. No. 5,440,719 and the IBM Intelligent ThinkDynamic™ Orchestrator.

The control module 230 is a policy engine that incorporates predetermined policies for data-path allocation to determine a course of action based on the information from the analysis module 220. The predetermined policies may be based on the desired power consumption, performance, or availability of resources (or any combination thereof) of the network hierarchy 100 for routing and processing the anticipated network traffic. In one embodiment, the control module 230 incorporates a policy to evaluate the power consumption, performance, and availability implications from the analysis module 230. Based on the evaluation, the control module 230 selects one of the data-path choices modeled in the analysis module 220, such as the number of switches required to route the anticipated workloads. Those switches that are no longer required are to be turned off to conserve power. For example, the network hierarchy 100 in FIG. 1 represents a data center housing multiple equipment racks, each rack including a switch 110 to provide switching to the equipment therein at Tier 3. Thus, each switch 120 at Tier 2 provides switching to multiple racks (as represented by Tier 3 switches). Likewise, each switch 110 at Tier 3 provides switching to multiple switches 120 at Tier 2. Based on the incorporated policy, the control module 230 may determine that specific network switches in the network hierarchy 100 should be turned off to reduce the number of redundant data paths from connection A to connection B for power savings.

In another embodiment, the control module 230 includes a policy that determines that, through data-path allocation, the network traffic through a subset of switches is of low enough priority to enable such switches to be put in a deep power state for power conservation. This would change the overall latency properties of the network but in a way already factored into the policy incorporated in the control module 230. Alternative embodiments are contemplated wherein the policy for data-path allocation, as incorporated by the control module 230, determines that the network traffic only traverses through a subset of available data ports on some of the switches along one or more allocated data paths, and the remaining data ports on such switches can be turned off or deactivated to conserve power. Accordingly, in one embodiment, the control module 230 acts as a hardware resource controller and includes a control agent 232 that provides instructions to the actuator module 240 for control of the individual network switches as well as for the control of the routing between such switches.

The actuator module 240 employs actuators 242 for controlling the power state of the individual switches (as available for each switch via information from the monitoring module 210) and the routing between such switches. Thus, each actuator can provide state control signals, software control signals, hardware control signals, routing control signals, or any combination thereof to one or more network switches to effect the desired data paths for the network traffic in accordance with the selected choice for data-path allocation provided by the control module 230.

The various components (modules, models, control agents, and actuators) in the system 200 employ either software or hardware support. In one embodiment, the components include one or more software programs, applications, or modules having computer-executable program instructions, stored on a computer readable medium (CRM), that include code from any suitable computer-programming language, such as C, C++, C#, Java, or the like. Embodiments of a CRM include, but are not limited to, an electronic, optical, magnetic, or other storage or transmission device capable of providing a processor of the server with computer-readable instructions. Other examples of a suitable CRM include, but are not limited to, a floppy disk, CD-ROM, DVD, magnetic disk, memory chip, ROM, RAM, an ASIC, a configured processor, any optical medium, any magnetic tape or any other magnetic medium, or any other medium from which a computer processor is operable to read instructions.

In another embodiment, the components may be implemented by a processor-based device, such as a computer, having one or more processors of any of a number of computer processors, such as processors from Intel, Motorola, AMD, Cyrix, that are coupled to the CRM to execute the computer-executable program instructions stored therein. Alternatively, each of the components may include its own processor or processors coupled to its respective CRM to execute the computer-executable program instructions stored therein.

Figure 3:
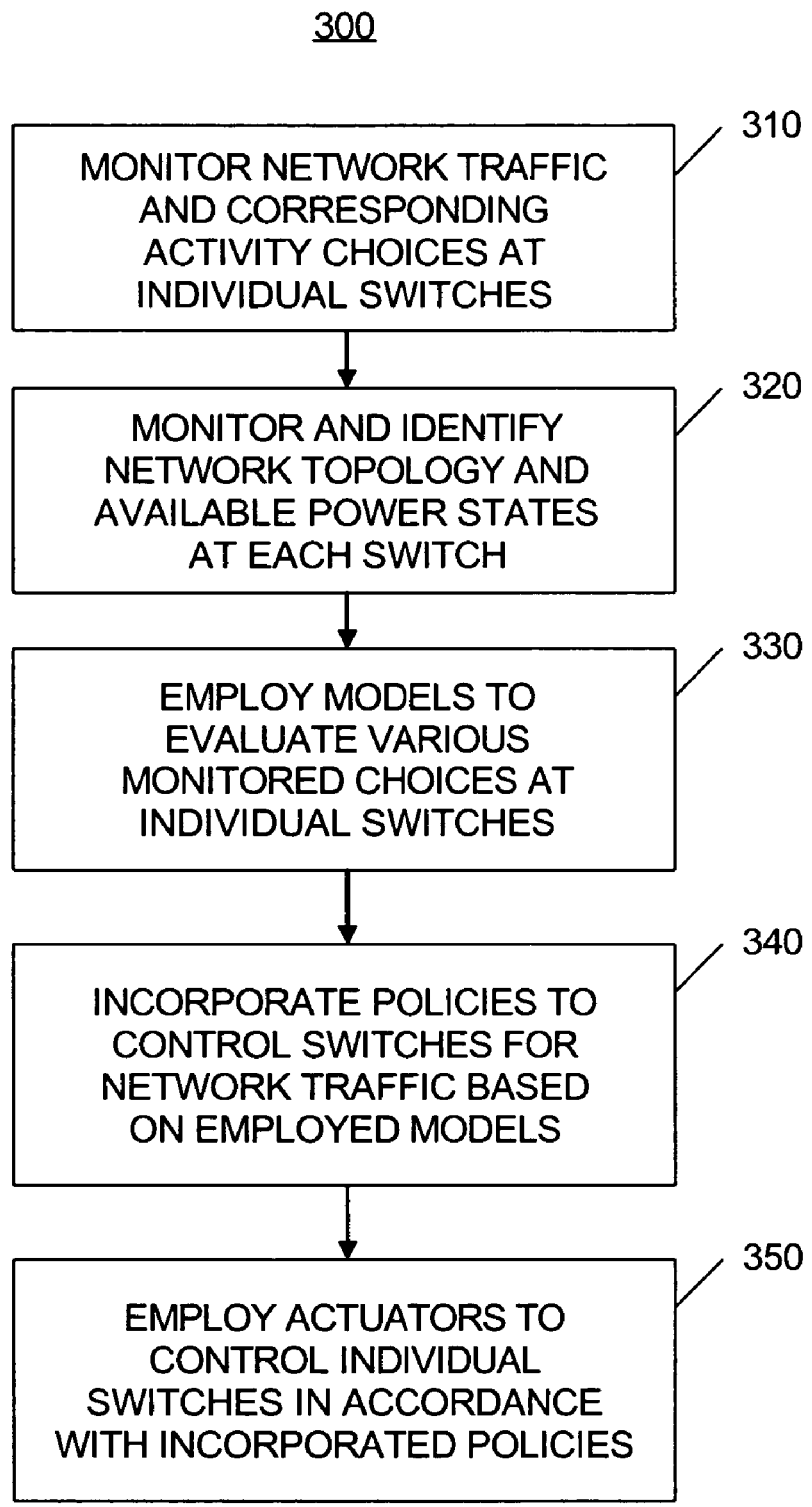
FIG. 3 illustrates a process flow for data-path allocation to optimize power consumption in a computing environment, in accordance with one embodiment of the present invention.

FIG. 3 illustrates a process flow 300 for data-path allocation to optimize power consumption of a network through data-path allocation. For illustrative purposes only and not to be limiting thereof, the process flow 300 is discussed in the context of the system 200 illustrated in FIG. 2 and the network hierarchy 100 in FIG. 1.

At 310, the workload behavior module 212 in the monitoring module 210 is employed to identify the network traffic in the network hierarchy 100 as required by the network applications.

At 320, the network discovery module 214 in the monitoring module 210 is employed to monitor and identify the network topology of the network hierarchy 100, including data paths used for past network traffic, and the switch usage properties of the all the network switches (110, 120, and 130) as described earlier. The network discovery module 214 also identifies the available power state of each network switch, as described earlier.

At 330, the analysis module 220 is employed to receive the workload behavior, or network traffic information, the network topology information, and information regarding the available power states of each network switch from the monitoring module 210 in order to run various models evaluating the power, performance, and availability implications of various choices or options for data-path allocation or data routing, and the impact of the switching configuration associated with each choice, for the network traffic identified at 310.

At 340, the control module 230 is employed to apply predetermined policies for data-path allocation to the various choices of resource usage based on information provided by the modeling done at 330. In one embodiment, the running of various models at 330 and the application of predetermined policies for data-path allocation to the output of each run at 340 may be performed iteratively to make available multiple choices for data routing in the network hierarchy 100 and the associated switching configuration, from which the control module 230 is operable to select the best choice based on predetermined criteria.

At 350, the actuators 242 in the actuator module 240 receive commands from the control agent 232 in the control module 230 to control the power state of the individual switches and the routing between such switches in accordance with the switching configuration associated with the selected choice for data-path allocation.

What has been described and illustrated herein are embodiments along with some of their variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A method for routing network traffic in a data network having a plurality of network switches, comprising:
    identifying network traffic to be routed in the data network;
    employing one or more models to evaluate multiple options for allocating at least one data path through the plurality of network switches in the data network to handle the identified network traffic, wherein employing the one or more models to evaluate the multiple options further comprises generating the multiple options through simulations of the one or more models to evaluate at least one of power consumption, performance, and availability of the plurality of network switches corresponding to the multiple options;
    selecting one option from the multiple options for data-path allocation based on at least one predetermined policy, wherein the at least one predetermined policy comprises at least one of desired power consumption, performance, and availability of resources; and
    controlling the plurality of network switches based on the selected option by controlling at least one of the plurality of network switches through which data transmission is at least one of reduced and not communicated into a power conserving state.

2. The method of claim 1, further comprising:
    identifying a network topology of the data network.

3. The method of claim 2, wherein employing the one or more models to evaluate the multiple options for data-path allocation comprises:
    employing the one or more models to evaluate the multiple options for data-path allocation in the data network to handle the identified network traffic based on at least the identified network topology.

4. The method of claim 1, further comprising:
    identifying at least two available power states for each of the plurality of network switches; and
    wherein controlling the plurality of network switches further comprises setting each of the plurality of network switches to one of the at least two available power states associated with each of the plurality of network switches based on the selected option.

5. The method of claim 4, wherein the data network further includes a plurality of servers for performing workloads, said plurality of servers being housed in one or more racks and wherein the plurality of network switches comprise network switches for switching data flow to and from the servers housed in the one or more racks.

6. The method of claim 1, wherein the plurality of network switches include multiple types of network switches, and selecting one option for provisioning resources comprises:
    selecting at least one of the plurality of switches and a type, from the multiple types, of the at least one network switch.

7. The method of claim 2, wherein identifying the network topology of the data network comprises:
    identifying the network topology of the data network based on past network traffic routing through the data network.

8. A system for routing network traffic in a data network having a plurality of network switches comprising:
    a monitoring module operable to identify the network traffic for routing and available power states for each of the plurality of network switches;
    an analysis module operable to employ simulations of one or more models to provide multiple simulations of routing of the identified network traffic through multiple data paths in the data network, wherein the analysis module is further configured to employ the one or more models to evaluate at least one of power consumption, performance, and availability of the plurality of network switches corresponding to the multiple simulations;
    a control module operable to select one of the multiple simulations provided by the analysis module based on at least one predetermined policy, the at least one predetermined policy comprises at least one of desired power consumption, performance, and availability of resources; and
    an actuator module operable to select a subset of the plurality of network switches to control and operable to control the selected subset of the plurality of network switches to enter into a power conserving state based on the selected simulation.

9. The system of claim 8, wherein the monitoring module is operable to further identify a network topology of the data network.

10. The system of claim 8, wherein the data network further comprises a plurality of servers for performing workloads, said plurality of servers being housed in one or more racks and wherein the plurality of network switches comprise network switches for switching data flow to and from the servers housed in the one or more racks.

11. The system of claim 8, wherein the control module comprises a control agent that provides instructions to the actuator module to control the power states of the plurality of network switches.

12. The system of claim 8, wherein the actuator module comprises a plurality of actuators operable to control the power state of each of the plurality of switches and a routing between the plurality of switches.

13. The system of claim 8, wherein the available power states of each of the plurality of network switches include one of:
    a power off of the switch;
    a power on of the switch;

a power state indicating a power level of the switch due to some of its subcomponents being deactivated; and a power state indicating a power level of the switch due to a change of its clock frequency.

14. A non-transitory computer readable medium on which is encoded program code executable by a processor for routing network traffic through a data network having a plurality of network switches, the program code comprising:

program code for identifying network traffic to be routed in the data network;

program code for employing one or more models to evaluate multiple options for allocating at least one data path in through the plurality of network switches in the data network to handle the identified network traffic, wherein the program code for employing one or more models to evaluate multiple options further comprises program code for generating the multiple options through simulations of the one or more models to evaluate at least one of power consumption, performance, and availability of the plurality of network switches corresponding to the multiple options;

program code for selecting one option from the multiple options for data path allocation based on at least one predetermined policy, wherein the at least one predetermined policy comprises at least one of desired power consumption, performance, and availability of resources; and program code for controlling the plurality of network switches based on the selected option by controlling at least one of the plurality of network switches through which data transmission is at least one of reduced and not communicated into a power conserving state.

15. The non-transitory computer readable medium of claim 14, further comprising:

program code for identifying a network topology of the data network.

16. The non-transitory computer readable medium of claim 15, wherein the program code for employing the one or more models to evaluate the multiple options for data-path allocation comprises:

program code for employing the one or more models to evaluate the multiple options for data-path allocation in the data network to handle the identified network traffic based on at least the identified network topology.

17. The non-transitory computer readable medium of claim 15, further comprising:

program code for identifying at least two available power states for each of the plurality of network switches.

18. The non-transitory computer readable medium of claim 17, wherein the program code for controlling the plurality of network switches comprises:

program code for setting each of the plurality of network switches to one of the at least two available power states associated with the each network switch based on the selected option.

19. The non-transitory computer readable medium of claim 14, wherein the plurality of network switches include multiple types of network switch, and the program code for selecting one option for provisioning resources comprises:

program code for selecting at least one of the plurality of switches and a type, from the multiple types, of the at least one network switch.

20. The non-transitory computer readable medium of claim 15, wherein the program code for identifying the network topology of the data network comprises:

program code for identifying the network topology of the data network based on past network traffic routing through the data network.

* * * * *